United States Patent [19]

Beale

[11] Patent Number: 4,621,028

[45] Date of Patent: Nov. 4, 1986

[54] GLASS HAVING CONTROLLABLE INFRARED TRANSMISSION

[76] Inventor: Harry A. Beale, 1307 Windham Rd., Columbus, Ohio 43220

[21] Appl. No.: 569,110

[22] Filed: Jan. 9, 1984

Related U.S. Application Data

[63] Continuation-in-part of Ser. No. 481,127, Apr. 1, 1983, abandoned.

[51] Int. Cl.⁴ .................. B32B 9/04; B32B 13/04; B32B 15/00; B32B 17/06
[52] U.S. Cl. .................. 428/432; 428/446; 428/702
[58] Field of Search .............. 428/432, 702, 701, 446; 420/424

[56] References Cited

U.S. PATENT DOCUMENTS

| | | | |
|---|---|---|---|
| 2,808,351 | 10/1957 | Colbert et al. | 428/702 X |
| 3,971,874 | 7/1976 | Ohta et al. | 428/432 |
| 4,000,346 | 12/1976 | Dowell | 428/432 X |
| 4,129,434 | 12/1978 | Plumat et al. | 427/162 X |
| 4,308,316 | 12/1981 | Gordon | 428/432 X |

FOREIGN PATENT DOCUMENTS

| | | | |
|---|---|---|---|
| 2057713 | 5/1971 | Fed. Rep. of Germany | 428/432 |
| 47-6313 | 2/1972 | Japan | 428/432 |
| 0193357 | 11/1982 | Japan | 428/432 |

*Primary Examiner*—George F. Lesmes
*Assistant Examiner*—Nancy A. B. Swisher
*Attorney, Agent, or Firm*—John L. Gray

[57] ABSTRACT

A glass sheet is provided with a coating which will automatically reflect infrared radiation if the ambient temperature is above about 45° F.–60° F. and will transmit infrared radiation if it is below about 45° F.–60° F. Such a coating is placed on the exterior surface of the glass. Additionally, the interior of the glass may be provided with a controllable infrared transmittable or reflective layer of material which is activated by means of an electric current transmitted therethrough and which will reflect infrared energy if so energized, but otherwise will transmit such infrared energy. This layer of material is preferably placed on the interior of the glass surface and activated during the nighttime period so that infrared energy is not transmitted outwardly. Alternatively, the controllable infrared transmittable or reflective layer of material may be positioned both on the exterior and interior of the glass surface.

2 Claims, 3 Drawing Figures

GLASS HAVING CONTROLLABLE INFRARED TRANSMISSION

INTRODUCTION

This is a continuation-in-part of U.S. patent application Ser. No. 481,127, filed Apr. 1, 1983, now abandoned.

BACKGROUND OF THE INVENTION

For many years glass used in buildings and automobiles has been coated to reduce transmission of heat. From the inception of coating such glass, the coating has functioned to exclude infrared energy from the sun. This is extremely effective in reducing the thermal input to buildings and automobiles with large areas of glass exposed to sunlight. Such coatings are most effective in the summer months and definitely reduce heat loads for air conditioning systems. The coatings used have been varied and examples are gold, titanium nitride, indium oxide and indium tin oxide. Such coatings usually are applied to the outer surface of the glass or the inside of the outermost layer of the glass. Because of this location of the coating, it is not particularly effective in reflecting heat back into the building or into the automobile during winter months. An additional undesirable effect of the use of such coatings is that during winter months, infrared energy from the sun continues to be reflected when it could well be used to provide heat for the occupants of the building or automobile equipped with such coated glass during hours of strong sunlight.

Present coatings for architectural glass are only about 75 percent as effective as they could be in concept and realistically are slightly less than 27 percent effective when considered over a full annual period in the middle United States region. The effectiveness of these coatings decreases the further north they are used and increases the further south they are used. While such coatings are effective in reflecting infrared energy, they also significantly reduce the transmission of solar energy in the visible spectrum. This can be an objectionable consideration for many uses.

SUMMARY OF THE INVENTION

The instant invention comprises a glass sheet which is provided with a coating which will automatically reflect infrared radiation if the ambient temperature is above about 45° F.–60° F. and will transmit infrared radiation if the ambient temperature is below about 45° F.–60° F. The principal ingredient of this coating is vanadium sesquioxide ($V_2O_3$) with an alloying ingredient to cause the transformation temperature to occur at approximately 45° F.–60° F. Such coating is placed on the exterior surface of the glass. This coating will transmit sunlight in the visible spectrum but will reflect infrared radiation if the temperature is above about 45° F.–60° F. and transmit infrared radiation if it is below about 45° F.–60° F. The interior of the glass may be coated with a material which when activated by means of an electric current transmitted therethrough will reflect infrared energy when so energized. Thus, if the glass is used in the window of a building, the electric current can be turned on to activate the interior coating so as to reflect infrared energy back into the building during the nighttime hours. If desired, the vanadium sesquioxide coating can be omitted and the electric current actuated coating can be placed on both sides of the glass.

It is therefore an object of this invention to provide a sheet of glass with a coating that may be activated to reflect or transmit infrared energy.

It is a further object of this invention to provide a sheet of glass with such a coating that either may be self-activated, depending upon the ambient temperature, or may be activated by the passage of an electrical current therethrough.

It is still a further object of this invention to provide such a glass sheet with a combination of such coatings, depending upon the particular application chosen.

Additional objectives and advantages of the present invention will become more readily apparent to those skilled in the art when the following general statements and descriptions are read in light of the appended drawings.

DETAILED DESCRIPTION OF THE INVENTION

Figure 1:
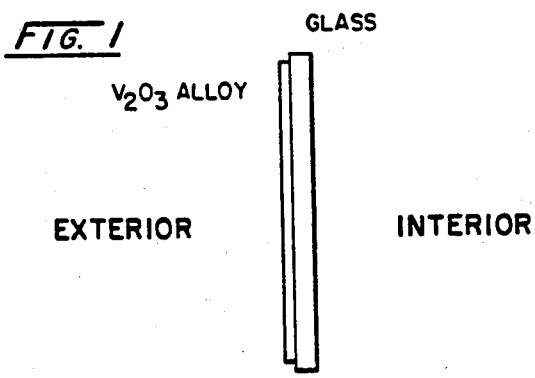
FIG. 1 is a side elevation view of a glass sheet for use in architectural or automotive applications which has been coated with an alloy of vanadium sesquioxide on the exterior thereof.

Referring now to FIG. 1, some materials will undergo a third order transformation at a specific temperature. A third order transformation is defined as an abrupt change in electrical, magnetic, optical, and chemical properties but no dimensional change. One such material that undergoes a third order change is vanadium sesquioxide ($V_2O_3$). This material undergoes a third order transformation at 175° K. At this temperature the electrical conductivity changes by nine orders of magnitude and there is an attendant change in the reflectivity of $V_2O_3$ at the same temperature. By adding VH and $VH_2$ the transformation temperature can be raised significantly. Additionally, if $Bi_2O_{3+x}$, $0.06 < x < 0.48$ is added, the third order transformation temperature of vanadium sesquioxide so alloyed will be raised to the 45° F.–60° F. range. Such an alloy may be applied to the exterior of a sheet of glass as is shown in FIG. 1. The preferred ranges for VH, $VH_2$ and $Bi_2O_{3+x}$ are 2–8 percent, 2–12 percent and 5–30 percent, respectively by weight.

The glass may be used for architectural or automotive or other uses with the vanadium sesquioxide coating on the exterior thereof, thus transmitting sunlight in the visible spectrum but reflecting infrared rays when the temperature is above about 45° F.–60° F. and transmitting it below that temperature. The coating may be applied in a variety of fashions. A multi target sputtering system is preferred. In this manner various materials can be codeposited with the $V_2O_3$ economically.

While this coating functions effectively during daylight hours, it is essentially inactive during the hours of darkness if the outside temperature is below 45° F.–60° F. and heat energy from inside the building or other enclosure will radiate outwardly. Consequently, a second coating is needed on the inside surface of the glass or near the inside surface, if it is a multilayer glass, which coating can be controlled by the application of a stimulus. A preferred stimulus is electric current. A variety of materials can be used for this coating which, of course, must also be able to transmit sunlight in the visible spectrum.

For example, one material is a semi-conductor still in freeze out at room temperature. Upon the passage of a small amount of electric current, the temperature would elevate and dopants would take over the conduction process. With proper selection of dopants and host semi-conductor, prior to current flow, the semi-conductor would transmit infrared energy and after degeneration was produced, infrared energy would be reflected much like a semi-metal. An example of such a semi-conductor material is bismuth selenide ($Bi_2Se_3$). The dopant in this case may be carbon or copper.

A magneto-optic-type material can also be used which changes its reflectivity to infrared energy upon being placed in a magnetic field generated by an electric current. Materials in this category are calcium fluoride, yttrium fluoride, and magnesium fluoride, in each instance being doped with thulium.

Furthermore, certain materials which influence the polarization through the use of an electric field could be used wherein a double layer system structured to counter rotate could allow excluding infrared energy. Materials in this category are potassium bromide and lithium fluoride.

Another class of materials changes its infrared reflectivitiy upon the application of a mechanical stress. Here a electromechanical means would be used to apply stress to the coating on the glass.

Another class of materials which would function for infrared reflectivity are electrochromic materials. In such an event the mere passage of a current through the coating changes the reflectivity.

Figure 2:
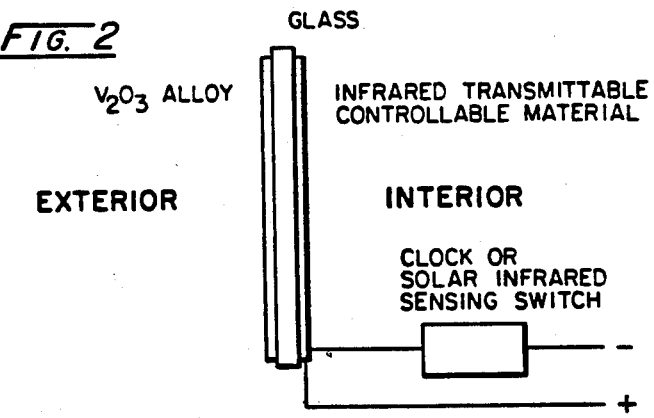
FIG. 2 is a side elevation view of a glass sheet which has been coated as in FIG. 1 but which has also been coated on the interior with an infrared transmittable, controllable material activated by an electric current.

Referring now to FIG. 2, it will be seen that the vanadium sesquioxide alloy is coated on the exterior of the glass sheet with the infrared transmittable, controllable material on the interior of the glass sheet and connected to a source of electric current which may be turned on or off by means of a solar infrared sensing or clock switch on the interior of the glass.

Figure 3:
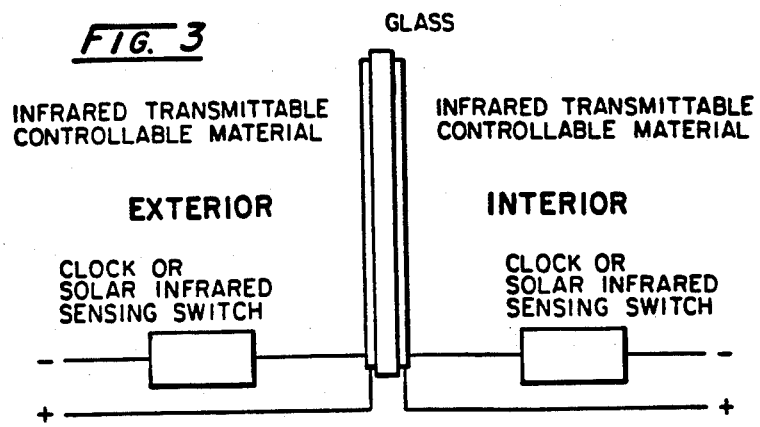
FIG. 3 is a side elevation view of the glass sheet as in FIGS. 1 and 2 wherein each side of the glass sheet has been coated with an infrared transmittable, controllable material.

Referring now to FIG. 3, if desired, the vanadium sesquioxide alloy may be omitted and each side of the glass sheet may be coated with an infrared transmittable, controllable material activated in each instance by electric current turned on or off by means of a solar infrared sensing or clock switch. If desired, the solar infrared sensing switch on the exterior may be replaced with a temperature sensitive switch.

While a multi-target sputtering system is the desired method of coating the glass surface with any of these materials, other well-known coating processes such as evaporation, chemical vapor deposition, and magnetron sputtering may be used.

It will thus be seen that there is disclosed herein a glass having a controllable infrared transmission. The transmission of infrared being activated by the ambient temperature or by means of an electric current.

While this invention has been described in its preferred embodiment, it is to be appreciated variations therefrom may be made without departing from the true scope and spirit of the invention.

What is claimed is:

1. A glass sheet provided on one side with a first coating containing $V_2O_3$ as its principal ingredient, said $V_2O_3$ containing a sufficient amount of at least one alloying element so that the transformation temperature of said $V_2O_3$ is elevated so that said coating will reflect infrared energy when the ambient temperature is above approximately 45° F.–60° F. and will transmit infrared energy when said ambient temperature is below approximately 45° F.–60° F. and wherein said glass sheet is provided on the other side with a second coating which reflects or transmits infrared energy when an electric current is passed therethrough, said coating comprising as its active ingredient a material selected from the group consisting of a doped semi-conductor which semi-conductor is in freeze out at normal room temperature and a magneto optic material which changes its reflectivity to infrared energy upon being placed in a magnetic field.

2. A glass sheet provided at least on one side with a coating which may be activated to reflect or transmit infrared energy by causing an electric current to be transmitted therethrough, said coating comprising a semi-conductor which is still in freeze out at room temperature but which contains a dopant and which, upon the passage of a small amount of current elevates the temperature of said semi-conductor so that said dopant in said semi-conductor takes over said conduction process and wherein said semi-conductor is bismuth selenide and said dopant is selected from the group consisting of carbon and copper.

* * * * *